United States Patent

[11] 3,633,205

[72] Inventors Tsze K. Lee
New Rochelle;
Jeffrey N. Brooks, Bronx; Ralph Logan,
West Islip, all of N.Y.
[21] Appl. No. 837,386
[22] Filed June 30, 1969
[45] Patented Jan. 4, 1972
[73] Assignee Loral Electronics Corporation
Bronx, N.Y.

[54] WIDEBAND INTERFEROMETER TYPE ANTENNA SYSTEMS
2 Claims, 11 Drawing Figs.
[52] U.S. Cl. .................................................... 343/113 R
[51] Int. Cl. .................................................... G01s 3/48
[50] Field of Search ...................................... 343/113

[56] References Cited
UNITED STATES PATENTS
3,148,369 9/1964 Zable et al. .................. 343/113 UX Primary Examiner—Rodney D. Bennett, Jr.
Assistant Examiner—Richard E. Berger
Attorney—Charles E. Temko ABSTRACT: Wideband interferometer systems each employing two fine channels, and means for synthesizing a coarse channel from signals received by said fine channels. One embodiment is adapted to be used in conjunction with a sophisticated computer on a time-sharing basis. The other embodiment includes simple truth table logic circuitry to provide a self-contained device.

| $\phi$ | $\psi_{12}$ | $\psi_{23}$ | $M_1$ | $M_2$ | $\phi$ | $\psi_{12}$ | $\psi_{23}$ | $M_1$ | $M_2$ |
|---|---|---|---|---|---|---|---|---|---|
| .0 | .0 | .0 | 0 | 0 | 46.0 | 135.8 | 6.4 | 5 | 5 |
| 1.0 | 25.1 | 22.0 | 0 | 0 | 47.0 | 158.1 | 21.5 | 5 | 5 |
| 2.0 | 50.3 | 44.0 | 0 | 0 | 48.0 | 170.1 | 36.4 | 5 | 5 |
| 3.0 | 75.4 | 65.9 | 0 | 0 | 49.0 | 6.8 | 50.9 | 6 | 5 |
| 4.0 | 100.4 | 87.9 | 0 | 0 | 50.0 | 23.1 | 65.2 | 6 | 5 |
| 5.0 | 125.5 | 109.8 | 0 | 0 | 51.0 | 39.1 | 79.2 | 6 | 5 |
| 6.0 | 150.5 | 131.7 | 0 | 0 | 52.0 | 54.7 | 92.9 | 6 | 5 |
| 7.0 | 175.5 | 153.6 | 0 | 0 | 53.0 | 70.0 | 106.3 | 6 | 5 |
| 8.0 | 20.4 | 175.4 | 1 | 0 | 54.0 | 85.0 | 119.4 | 6 | 5 |
| 9.0 | 45.3 | 17.1 | 1 | 1 | 55.0 | 99.6 | 132.1 | 6 | 5 |
| 10.0 | 70.1 | 38.8 | 1 | 1 | 56.0 | 113.8 | 144.6 | 6 | 5 |
| 11.0 | 94.8 | 60.4 | 1 | 1 | 57.0 | 127.7 | 156.7 | 6 | 5 |
| 12.0 | 119.4 | 82.0 | 1 | 1 | 58.0 | 141.2 | 168.5 | 6 | 5 |
| 13.0 | 143.9 | 103.4 | 1 | 1 | 59.0 | 154.3 | .0 | 6 | 6 |
| 14.0 | 168.4 | 124.8 | 1 | 1 | 60.0 | 167.1 | 11.2 | 6 | 6 |
| 15.0 | 12.7 | 146.1 | 2 | 1 | 61.0 | 179.5 | 22.0 | 6 | 6 |
| 16.0 | 36.9 | 167.3 | 2 | 1 | 62.0 | 11.4 | 32.5 | 7 | 6 |
| 17.0 | 61.0 | 8.4 | 2 | 2 | 63.0 | 23.0 | 42.7 | 7 | 6 |
| 18.0 | 85.0 | 29.4 | 2 | 2 | 64.0 | 34.3 | 52.5 | 7 | 6 |
| 19.0 | 108.8 | 50.2 | 2 | 2 | 65.0 | 45.1 | 61.9 | 7 | 6 |
| 20.0 | 132.5 | 70.9 | 2 | 2 | 66.0 | 55.5 | 71.1 | 7 | 6 |
| 21.0 | 156.0 | 91.5 | 2 | 2 | 67.0 | 65.5 | 79.8 | 7 | 6 |
| 22.0 | 179.4 | 112.0 | 2 | 2 | 68.0 | 75.1 | 88.3 | 7 | 6 |
| 23.0 | 22.7 | 132.3 | 3 | 2 | 69.0 | 84.4 | 96.3 | 7 | 6 |
| 24.0 | 45.7 | 152.5 | 3 | 2 | 70.0 | 93.2 | 104.0 | 7 | 6 |
| 25.0 | 68.6 | 172.5 | 3 | 2 | 71.0 | 101.5 | 111.4 | 7 | 6 |
| 26.0 | 91.3 | 12.3 | 3 | 3 | 72.0 | 109.5 | 118.3 | 7 | 6 |
| 27.0 | 113.7 | 32.0 | 3 | 3 | 73.0 | 117.1 | 124.9 | 7 | 6 |
| 28.0 | 136.0 | 51.5 | 3 | 3 | 74.0 | 124.2 | 131.2 | 7 | 6 |
| 29.0 | 158.1 | 70.9 | 3 | 3 | 75.0 | 130.9 | 137.1 | 7 | 6 |
| 30.0 | 180.0 | 90.0 | 3 | 3 | 76.0 | 137.2 | 142.6 | 7 | 6 |
| 31.0 | 21.7 | 108.9 | 4 | 3 | 77.0 | 143.1 | 147.7 | 7 | 6 |
| 32.0 | 43.1 | 127.7 | 4 | 3 | 78.0 | 148.5 | 152.5 | 7 | 6 |
| 33.0 | 64.3 | 146.2 | 4 | 3 | 79.0 | 153.5 | 156.9 | 7 | 6 |
| 34.0 | 85.2 | 164.6 | 4 | 3 | 80.0 | 158.1 | 160.9 | 7 | 6 |
| 35.0 | 106.0 | 2.7 | 4 | 4 | 81.0 | 162.3 | 164.5 | 7 | 6 |
| 36.0 | 126.4 | 20.6 | 4 | 4 | 82.0 | 166.0 | 167.7 | 7 | 6 |
| 37.0 | 146.6 | 38.3 | 4 | 4 | 83.0 | 169.3 | 170.6 | 7 | 6 |
| 38.0 | 166.6 | 55.7 | 4 | 4 | 84.0 | 172.1 | 173.1 | 7 | 6 |
| 39.0 | 6.2 | 72.9 | 5 | 4 | 85.0 | 174.5 | 175.2 | 7 | 6 |
| 40.0 | 25.6 | 89.9 | 5 | 4 | 86.0 | 176.5 | 176.9 | 7 | 6 |
| 41.0 | 44.7 | 106.6 | 5 | 4 | 87.0 | 178.0 | 178.3 | 7 | 6 |
| 42.0 | 63.5 | 123.1 | 5 | 4 | 88.0 | 179.1 | 179.2 | 7 | 6 |
| 43.0 | 82.1 | 139.3 | 5 | 4 | 89.0 | 179.8 | 179.8 | 7 | 6 |
| 44.0 | 100.3 | 155.3 | 5 | 4 | 90.0 | .0 | .0 | 8 | 7 |
| 45.0 | 118.2 | 171.0 | 5 | 4 | | | | | |

WIDEBAND INTERFEROMETER TYPE ANTENNA SYSTEMS

This invention relates generally to the field of interferometer antenna systems used to determine the angle of incidence of electromagnetic waves impinging upon a plurality of antennas, and more particularly to improved forms providing improved accuracy consistent with simplicity of circuitry.

It is among the principal objects of the present invention to provide an interferometer system in which the coarse channel thereof is synthetically produced from a pair of fine channels.

Another object of the invention lies in the provision of an improved interferometer system particularly adapted for use on aircraft, in which available space is more limited.

Yet another object of the invention lies in the provision of an improved interferometer system in which the customary antenna spacing of a half wavelength for the coarse channel and its accompanying disadvantages is not employed.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 6 is a chart showing phase differences for the disclosed embodiments.

Before entering into a detailed consideration of the structural aspects of the disclosed embodiment, a brief review of the theory involved is considered apposite.

Figure 4:
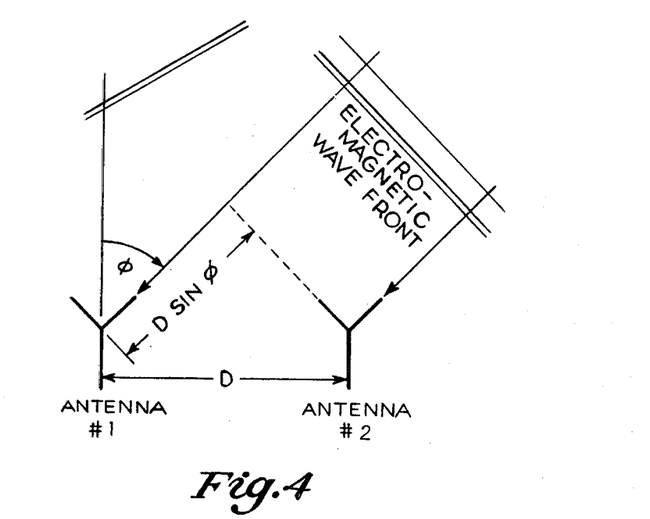
FIG. 4 is a schematic diagram showing the theory of operation of an elementary interferometer.

Any interferometer system consists of two or more antennas spaced a given distance apart so that incident electromagnetic energy impinging on the antennas results in a phase difference between the received signals. The simplest case of two antennas is shown in FIG. 4. The additional path length to antenna No. 1 is $D \sin(\phi)$, the phase difference $\psi'_{12}$ between the antennas is therefore:

$$\psi_{12}' = \beta D \sin \phi \sin \theta$$

where $$\beta = \frac{2\pi}{\lambda} = \text{propagation constant}$$

Eq. (1)

$$\therefore \psi_{12}' = 2\pi \left(\frac{D}{\lambda}\right) \sin \phi, \text{ for } \theta \left(\begin{array}{c}\text{elevation}\\\text{angle}\end{array}\right) = \frac{\pi}{2}$$

Any method of measuring this phase difference is ambiguous in the sense that, at best, the measurement cannot distinguish a phase difference outside of the range of $\pi$. For example, for $\psi'_{12} = \pi + (\pi/4)$, the measured phase difference $\psi_{12}$ will be $\pi/4$. The angle $\phi_c$ where $\psi_{12}$ is just equal to $\pi$ thus defines the unambiguous spatial coverage of the system as a region centered at boresight and extending to $\pm \phi_c$. The latter is easily derived by:

Eq. (2)

$$1\pi = 2\pi \left(\frac{D}{\lambda} \sin \phi\right)$$

$$\therefore \phi_o = \sin^{-1}\left\{1/2 \frac{1}{(D/\lambda)}\right\}$$

To cover the whole forward hemisphere, $\phi_c = 90°$ and $(D/\lambda) = 0.5$. To cover $\pm 45°$, $(D/\lambda) = 0.707$ etc.

If a phase imbalance $\Delta \psi$ exists between the two channels, a discrepancy or error, $\Delta \psi$, will exist between the actual incoming spatial angle and the apparent angle. This error is approximately given by:

Eq. (3)

$$\Delta \phi = \frac{\Delta \psi}{2\pi \frac{D}{\lambda} \cos \phi \sin \theta}$$

Figure 5:
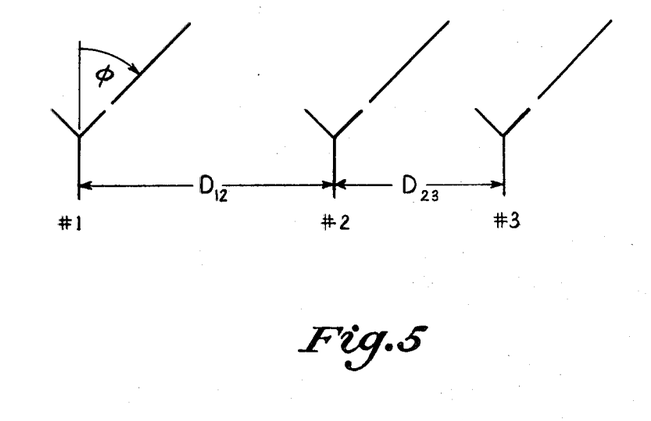
FIG. 5 is an elementary diagram showing the antenna spacing of the two disclosed embodiments.

The farther apart the antennas are spaced, the less spatial error exists, for a fixed phase imbalance. Therefore, it is desirable from the standpoint of accuracy to space the antennas as far apart as possible. This criterion will limit the unambiguous region that can be covered. A tradeoff therefore exists for this simple two element interferometer between accuracy and unambiguous coverage. To avoid this, a three element interferometer can be used as illustrated in FIG. 5. Typical spacings are $D_{12} = 0.5\psi$ and $D_{23} = 4\mu$. The phase difference $\psi_{12}$ therefore unambiguous covers the entire forward hemisphere, albeit with poor accuracy (approximately 5° for a typical system). This is sufficient, however, to resolve ambiguities in the phase difference $\psi_{23}$ which can then provide accuracies typically better than 1°. The combination of the so-called "coarse" and "fine" channels thus provides a wide-coverage high-accuracy system.

Several drawbacks exist, however, with this type of interferometer, all of them being associated with the coarse channel. The close spacing used becomes very small in wavelength for reduced frequencies. This implies a very high mutual coupling resulting in a bandwidth limitation of such a system to approximately an octave. A further effect of the close spacing is the possibility of nonrandom reflections from surrounding structures (e.g. in an aircraft installation) which may result in errors too large to resolve the fine channel ambiguities. The result of this is to force a reduction of the fine channel spacing. This reduces the required coarse channel accuracy requirements, but sacrifices overall accuracy.

Figure 7:
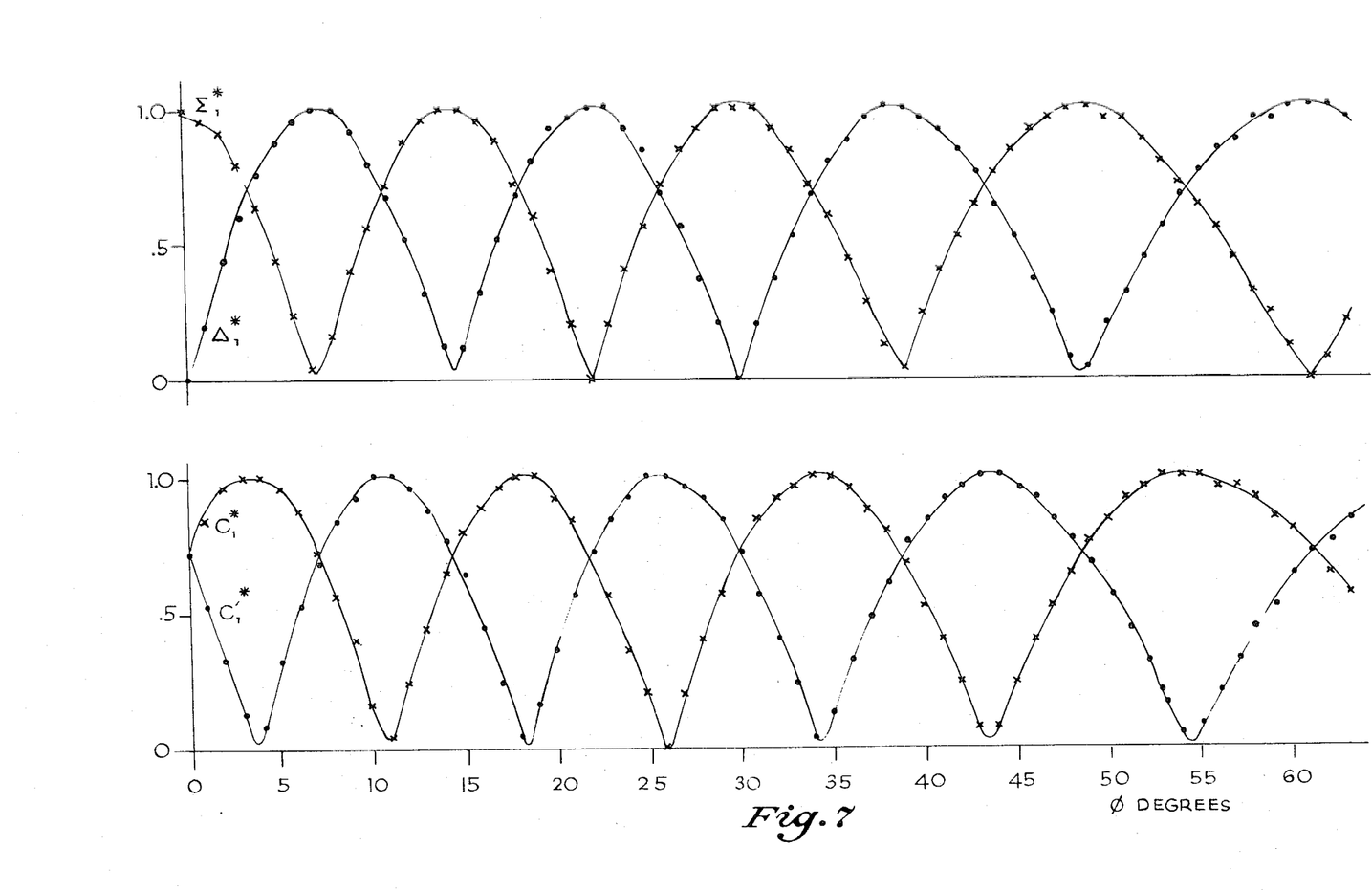
FIG. 7 is a second chart showing phase differences for different angles in the disclosed embodiments.

To avoid the above disadvantages, we have developed an interferometer with accompanying processing circuitry. As illustrated in FIG. 6, our construction also employs three antennas. The spacing of these antennas, however, are both wide, as for example, $D_{12} = 4\lambda$, and $D_{23} = 3.5\lambda$. In effect, both channels are "fine" channels and each contains ambiguities. Taken together, however, the pair of numbers $(\psi_{12}, \psi_{23})$ is unambiguous over $\pm 90°$. That is to say, for every value of $\phi$, there is exactly one value of $(\psi_{12}, \psi_{23})$ corresponding to $\phi$. This is illustrated in FIG. 7 for the spacings just mentioned. For negative angles, the same conclusions apply, since $\psi_{12}$ and $\psi_{23}$ are odd functions of $\phi$.

Mathematically, our interferometer systems may be viewed as follows: the measured phase difference can be expressed in terms of the actual phase differences by means of two integers M1 and M2 where:

Eq. (4) $\psi_{12} = \psi_{12}' - M_1 \pi$
Eq. (5) $\psi_{23} = \psi_{23}' - M_2 \pi \quad \{M_1, M_2^3 - \pi \leq \psi_{12', 23} \leq \pi\}$ Equations 4 and 5 are two simultaneous equations with three unknowns, thereby appearing to be incapable of solution. Addition information is present, however, in that two of the unknowns (M1 and M2) are integers. The equations therefore belong to the class of Diophantine problems, where a solution, unique to the physical problem, may sometimes be obtained, depending, in this case, on the spacings $D_{12}$ and $D_{23}$.

The problem of extracting the spatial angle $\phi$ from the phase information $\psi_{12}$ and $\psi_{23}$ depends on the availability and extent of computer space and speed. For applications in which a sophisticated computer is not available, the first embodiment, illustrated in FIG. 1 is used.

The outputs of the magic tees and couplers, $\Sigma_{1,2}$, $\Delta_{1,2}$, $C_{1,2}$, $C'_{1,2}$ can be derived in a straightforward fashion by making use of the fact that the three signals emerging from the limiter are equal in amplitude and have a known phase difference. Thus $E_1$ and $E_2$, the signals out of the first and second limiters respectively can be expressed, for a normalized amplitude of unity, as:

$$E_1 = e^{-j\phi d} e^{jwt}$$
$$E_2 = e^{jwt}$$

where
$d = D \sin \phi$
$\phi =$ the incoming angle of the signal
$D =$ the separation distance between the antennas
$W =$ the radian *if* frequency
$\beta =$ the propagation constant of the incoming signal
$j = \sqrt{-1}$ In the following equations, the superscript "L" denotes the phasor form of the variable. The outputs of the first magic tee, $\Sigma_1^L$ and $\Delta_1^L$ are given by definition:

$$\Sigma_1^L \text{ and } \Delta_1^L$$

$$\Sigma_1^L = \frac{E_1 + E_2}{2}, \quad \Delta_1^L = \frac{E_1 - E_2}{2}$$

thus:

$$\frac{2\Sigma_1}{e^{jwt}} = E_1 + E_2 = 1 + e^{-j\beta d} = \frac{e^{j\frac{\beta d}{2}} + e^{-j\frac{\beta d}{2}}}{e^{j\frac{\beta d}{2}}}$$

$$= 2e^{-j\frac{\beta d}{2}} \cos \frac{\beta d}{2}$$

$$\therefore \Sigma_1 = \sin\left(\frac{\beta d}{2} + \frac{\pi}{2}\right) \cos\left(wt - \frac{\beta d}{2}\right)$$

$$\frac{2\Delta_1^L}{e^{jwt}} = \frac{1 - e^{-j\beta d}}{2} = \frac{e^{j\frac{\beta d}{2}} - e^{-j\frac{\beta d}{2}}}{2e^{j\frac{\beta d}{2}}}$$

$$= je^{-j\frac{\beta d}{2}} \sin \frac{\beta d}{2}$$

$$\therefore \Delta_1 = \sin \frac{\beta d}{2} \cos\left(wt - \frac{\beta d}{2} + \frac{\pi}{2}\right)$$

In a similar manner, all eight outputs of the magic tees and couplers involved may be derived. The results are:

$$\Sigma_1 = \sin\left(\frac{\beta d_1}{2} - \frac{\pi}{2}\right) \cos\left(wt - \frac{\beta d_1}{2}\right)$$

$$\Sigma_2 = \sin\left(\frac{\beta d_2}{2} - \frac{\pi}{2}\right) \cos\left(wt - \frac{\beta d_2}{2} - \beta d_1\right)$$

$$\Delta_1 = \sin\left(\frac{\beta d_1}{2}\right) \cos\left(wt - \frac{\beta d_1}{2} + \frac{\pi}{2}\right)$$

$$\Delta_2 = \sin\left(\frac{\beta d_2}{2}\right) \cos\left(wt - \frac{\beta d_2}{2} - \beta d_1 + \frac{\pi}{2}\right)$$

$$C_1 = \sin\left(\frac{\beta d_1}{2} - \frac{3\pi}{4}\right) \cos\left(wt - \frac{\beta d_1}{2} - \frac{\pi}{4}\right)$$

$$C_2 = \sin\left(\frac{\beta d_2}{2} - \frac{3\pi}{4}\right) \cos\left(wt - \frac{\beta d_2}{2} - \beta d_1 - \frac{\pi}{4}\right)$$

$$C'_1 = \sin\left(\frac{\beta d_1}{2} - \frac{\pi}{4}\right) \cos\left(wt - \frac{\beta d_1}{2} + \frac{\pi}{4}\right)$$

$$C'_2 = \sin\left(\frac{\beta d_2}{2} - \frac{\pi}{4}\right) \cos\left(wt - \frac{\beta d_2}{2} - \beta d_1 + \frac{\pi}{4}\right)$$

Figure 8:
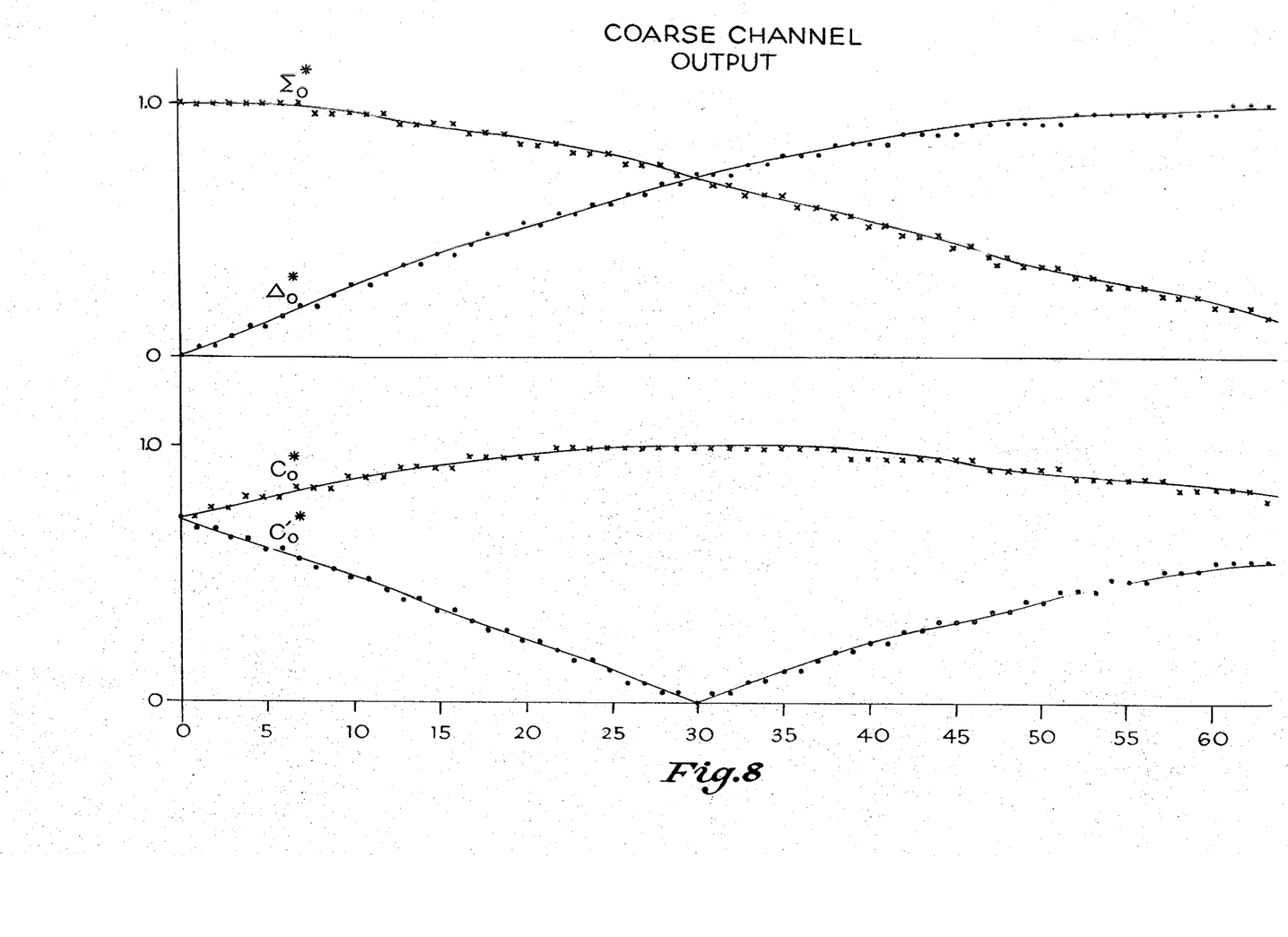
FIG. 8 is a schematic diagram showing synthesized coarse channel output.

The amplitudes of all eight of the outputs are ambiguous in the sense that for any given value of the amplitude, there is more than one angle $\phi$ corresponding to said value. This may be observed in FIG. 8 in the drawing which is a computer plot of absolute value of amplitudes of $\Sigma_1$, $\Sigma_2$, $\Delta_1$ and $\Delta_2$ against $\phi$ for $0° \leq \phi \leq 63°$. It may be observed that $$\Sigma^*_1 = \left|\sin\left(\frac{\beta d_1}{2} - \frac{\pi}{2}\right)\right|$$

$$\Delta^*_1 = \left|\sin\left(\frac{\beta d_1}{2}\right)\right|$$

$$C_1^* = \left|\sin\left(\frac{\beta d_1}{2} - \frac{3\pi}{4}\right)\right|$$

$$C_1'^* = \left|\sin\left(\frac{\beta d_1}{2} - \frac{\pi}{4}\right)\right|$$

where the asterisk denotes amplitude

At this point, it is instructive to consider the results if the spacing between antennas is $0.5\lambda_H$.

Denoting this hypothetical case by a subscript "0," there is obtained $$\Sigma_o^* = \left|\sin\left(\frac{2\pi}{\lambda/H} \cdot \frac{.5\lambda/H}{2} \sin \phi + \frac{\pi}{2}\right)\right| = \left|\sin\left(.5\pi \sin \phi + \frac{\pi}{2}\right)\right|$$

$$\Delta_o^* = \left|\sin(.5\pi \sin \phi)\right|$$

$$C_o^* = \left|\sin\left(.5\pi \sin \phi + \frac{\pi}{4}\right)\right|$$

$$C_o^{1*} = \left|\sin\left(.5\pi \sin \phi + \frac{3\pi}{4}\right)\right|$$

These are depicted in FIG. 6 and reveal that for
$$0 \leq \phi \leq 63°, \Sigma_o^*, \Delta_o^*, \text{ and } C_o^*$$
are all unambiguous. (Although not shown on the graph, the terms are unambiguous for $0° \leq \phi \leq 90°$.) All four terms are odd functions of $\phi$.

Therefore, if $C_o^* \geq C_o'^*$, $\phi$ is non-negative, and if $C_o^* < C_o'^*$, $\phi$ is negative.

Thus the four "coarse" terms unambiguously cover $\pm 90°$.

With the foregoing discussion in mind, reference may now be made to FIG. 1 in the drawings, in which the first embodiment of the invention is illustrated. In accordance with this embodiment, the device, generally indicated by reference character 10 includes first, second and third antennae, 11, 12, and 13, respectively, which, in accordance with standard practice are positioned on a common horizontally disposed axis, though two different axes may be used. The distance between the first antenna 11 and the second antenna 12 is indicated by reference character 14, and that between the second antenna 12 and the third antenna 13 is indicated by reference character 15. This spacing differs from that employed in the prior art, in that the customary antenna spacing of one pair of antenna is normally a half wavelength (as determined by the wavelength of the highest frequency received), and the other is larger than a half wavelength, so that there is a source of information for a coarse channel and a fine channel. By contrast, in the present device, antenna spacings of $3.5\lambda_H$ and $4\lambda_H$ are suitable, as is $3\lambda_H$ and $3.5\lambda_H$. The difference of $0.5\lambda$, is a sufficient but not necessary one for resolving ambiguities certain restrictions on the system imbalances. This spacing is necessary to cover unambiguously a spatial sector of 180°. For a smaller spatial sector, the spacing may be greater than $0.5\lambda_H$.

The received signals are passed to mixers 16, preamplifiers 17, log IF limiters 18 to power splitters 19. Conductors 20, 21, 22 and 23 are interconnected to a pair of magic tees 24 and 25. Four conductors 26, 27, 28 and 29 lead from the magic tees to four power splitters 30, 31, 32 and 33.

The power splitters 19 are also connected through conductors 34, 35, 36 and 37 to couplers 38 and 39, and these couplers, in turn, are connected through conductors 40, 41, 42 and 43 to power splitters 44, 45, 46 and 47.

The above-described network is interconnected, as shown in FIG. 1, through conductors 48, 49, 50, 51, 52, 53, 54, 55, 56, 57, 58, 59, 60, 61, 62 and 63 to eight harmonic generators 64, 65, 66, 67, 68, 69, 70 and 71. The harmonic generators are interconnected in turn through conductors 72, 73, 74, 75, 76, 77, 78 and 79 to four magic tees 80, each serially connected through a filter 81, an amplifier 82, a peak detector and stretcher 83, and a video amplifier 84 to a coarse logic comparator which synthesizes a coarse channel.

Conductors 86, 87, 88 and 89 are connected to power splitters 30, 31, 44 and 45 whereby a signal is conducted through peak detectors 90 and video amplifiers 91 to the fine logic comparator 92, whereby the set of information provided by the first and second antennae 11 and 12, respectively, provides the fine channel.

It will be understood by those skilled in the art, that there are many ways in which the information present in each channel after the *if* amplification may be processed. In the present embodiment, use is made of various *if* hybrid combinations and harmonic generators, which are interconnected in such a manner that the use of simple, truth table type logic circuitry is sufficient to determine the incoming direction of a signal.

Figure 1A:
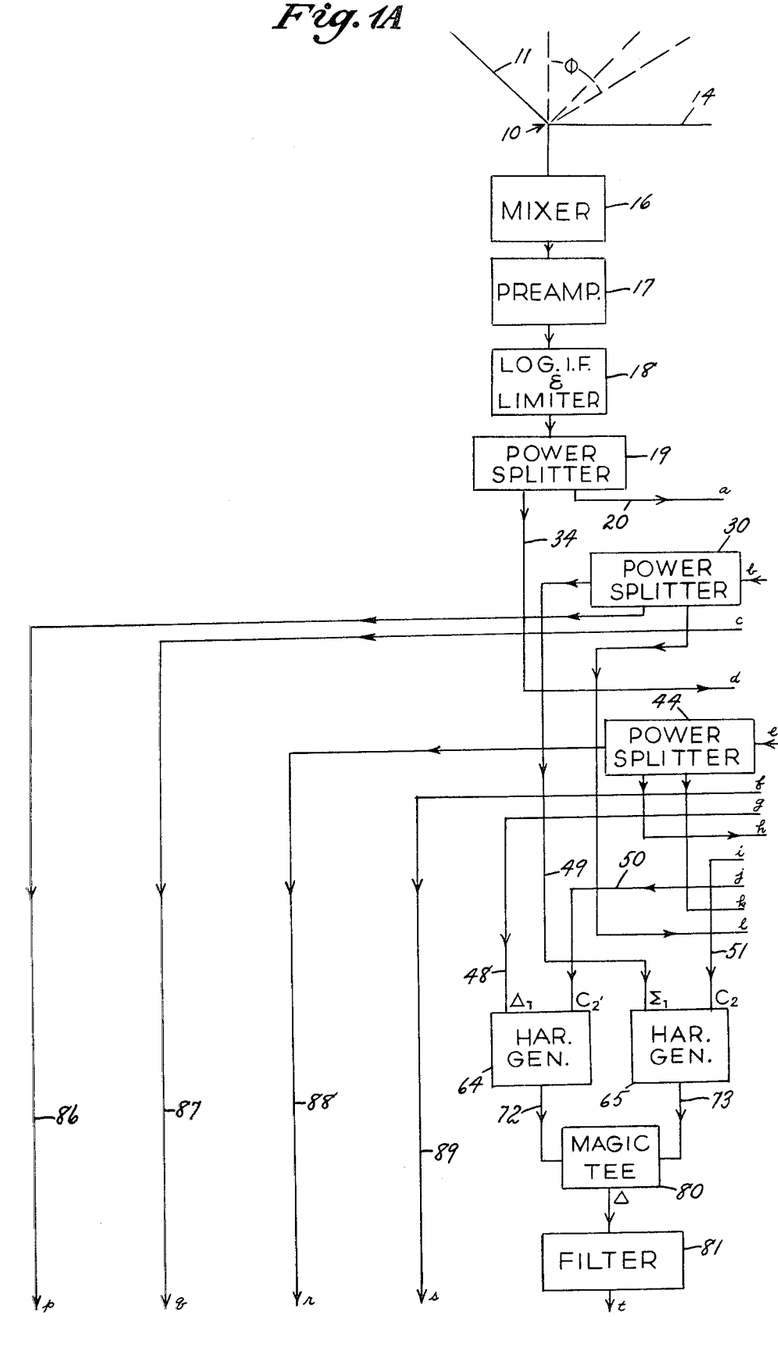
FIGS. 1A, 1B, 1C and 1D comprise a schematic electrical wiring diagram of a first embodiment of the invention.
Figure 1B:
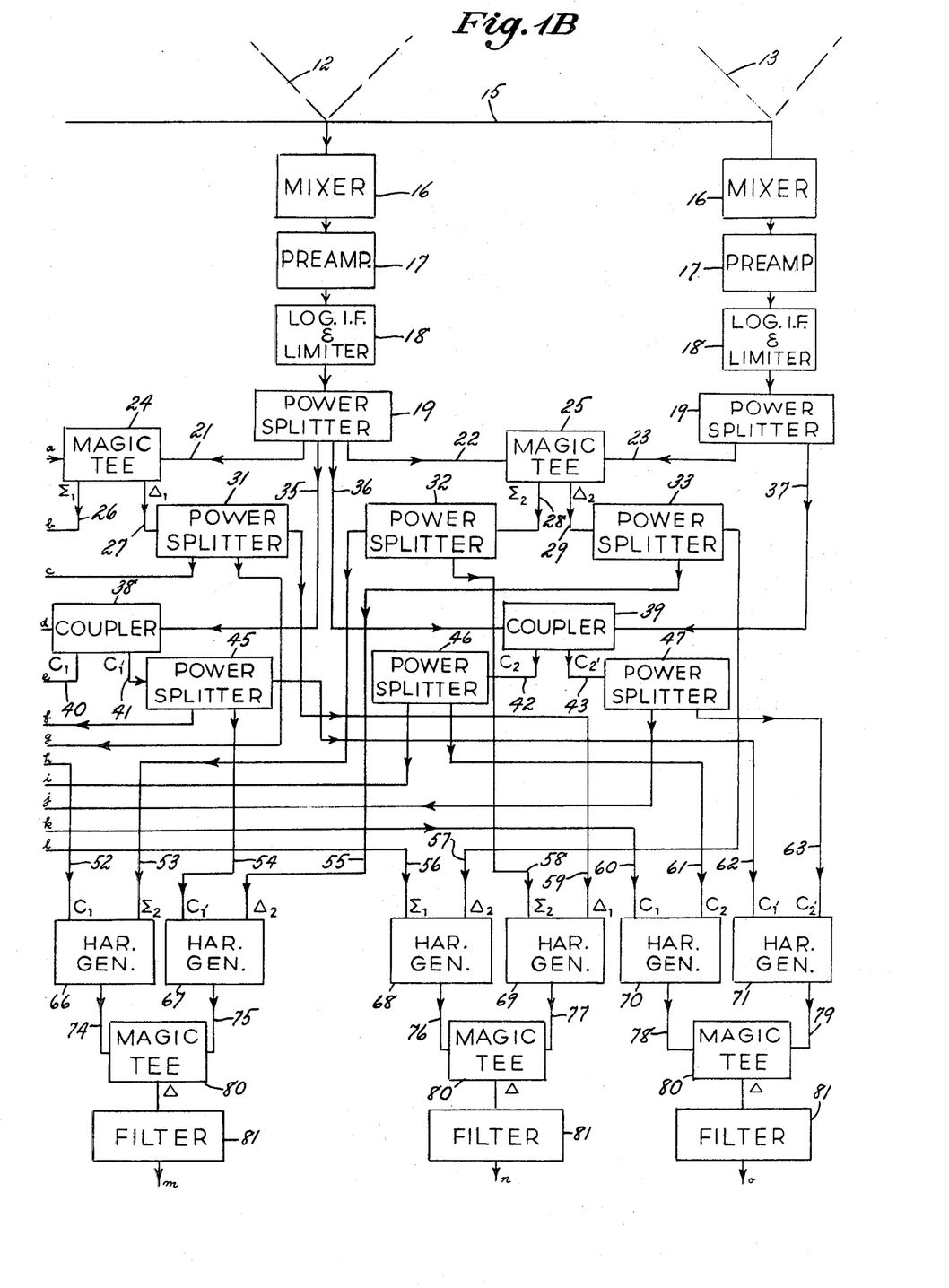
Figure 1C:
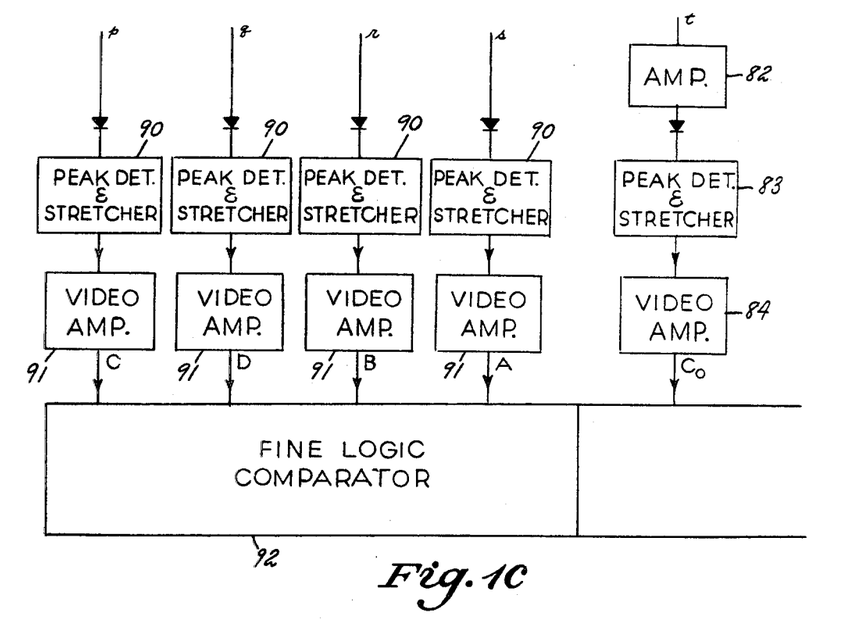
Figure 1D:
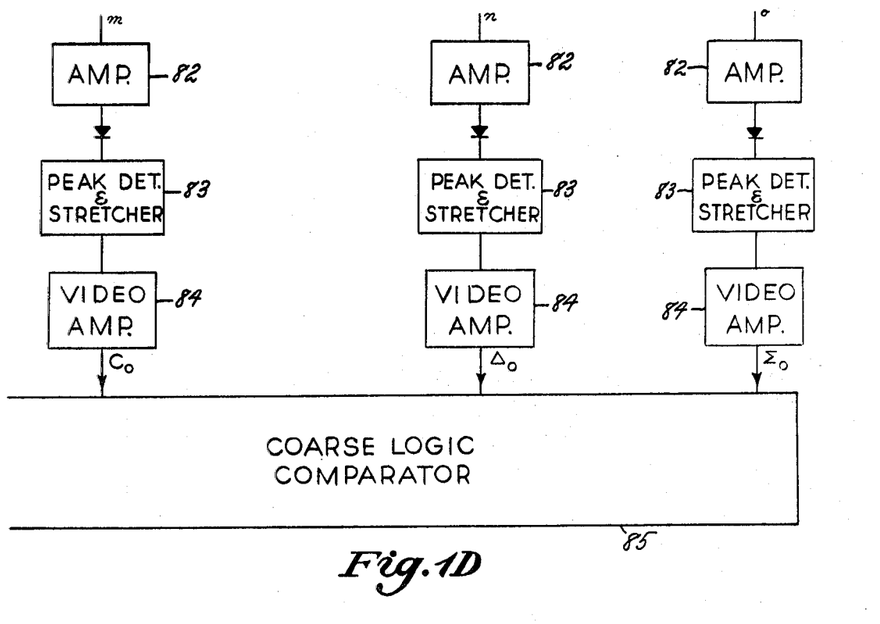
Figure 2:
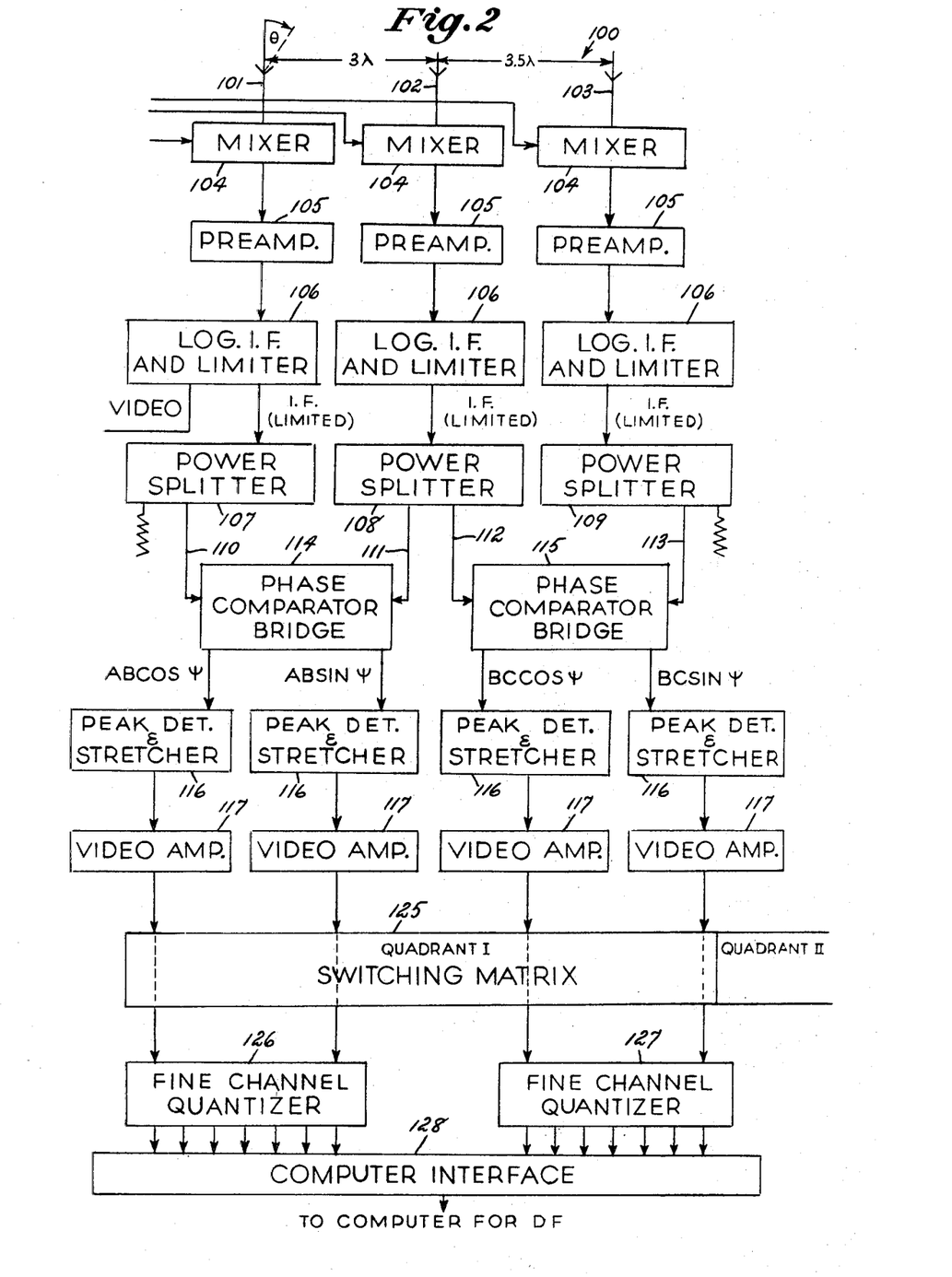
FIG. 2 is a schematic wiring diagram of a second embodiment of the invention.

In the second embodiment of the invention illustrated in FIG. 2 in the drawing, it will be observed that the same antenna and front end configuration is utilized, but resort is made to somewhat simpler *if* and video circuitry which provides outputs, which when quantized and sent to a digital computer, make for a straightforward calculation of the signal direction. The uniqueness of this approach is in the use of 360° phase comparators at the *if* stage.

As seen in FIG. 2, the second embodiment, generally indicated by reference character 100 includes first, second and third antennas 101, 102, and 103 which feed mixers 104, preamplifiers 105, log IF and limiters 106 connected to power splitters 107, 108 and 109. Conductors 110, 111, 112 and 113 are connected to a pair of 360° phase comparator bridges 114 and 115, the outputs of which are connected to peak detector and stretchers 116 and video amplifiers 117. These in turn are connected to a switching matrix 125 leading to fine channel quantizers 126 and 127 which are connected to a computer interface 128.

In the second embodiment, the phase comparator outputs are proportional to the sine and cosine of the phase differences of the inputs. Simple algorithms have been developed to act on these outputs and yield the direction angle $\theta$. The outputs are thus quantized and sent, together with knowledge of frequency to a computer for solution.

Figure 3:
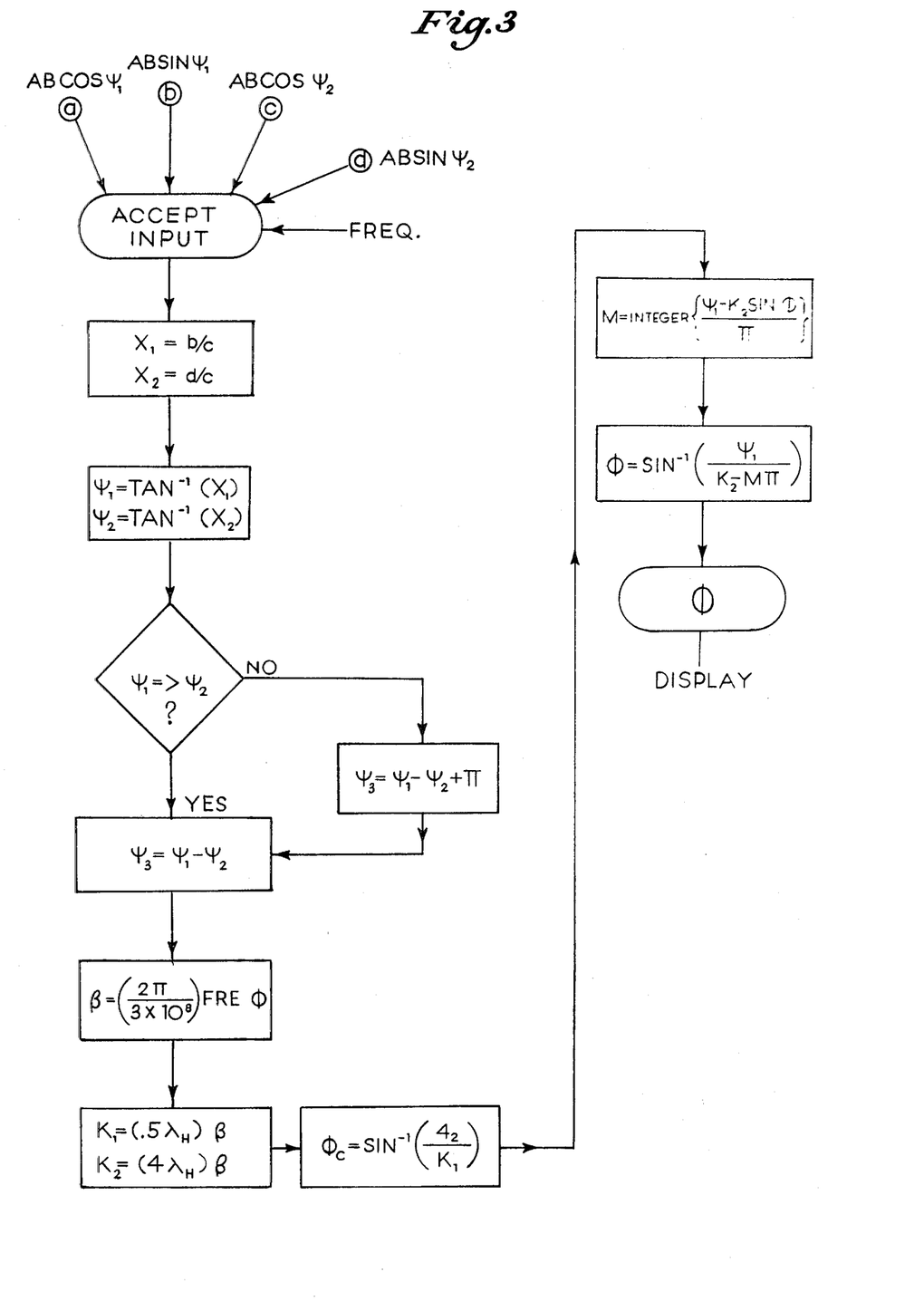
FIG. 3 is a flow diagram showing a suitable computer program yielding a desired spatial angle $\phi$.

The algorithm and subsequent computer program is illustrated in the flow chart in FIG. 3 in the drawing. The essence of the program is the recreation of the equivalent coarse channel phase difference $\psi_3$ which is then used to resolve the ambiguity in the form of the integer "M" in the calculation of $\theta$ from the fine channel phase difference $\psi_1$.

It will be observed that both embodiments share three major advantages, mainly that mutual coupling errors for all intents and purposes are eliminated, and reflection errors are substantially reduced. In addition, larger antennas with consequent higher gain may be employed, and system bandwidth is substantially increased.

The first embodiment has the additional advantage of a fairly simple, self-contained logic system, eliminating the need for a separate large computer. The second embodiment, although requiring a computer, has relatively simple and inexpensive components. A thorough error analysis of both systems indicates that the effect of imbalance among components of the systems are reasonably small, so that high accuracy in practice is obtainable.

We wish it to be understood that we do not consider the invention limited to the precise details of structure shown and set forth in this specification, for obvious modifications will occur to those skilled in the art to which the invention pertains.

We claim:

1. In a wide-band antenna interferometer system including first, second and third antennas, and employing two sets of received information, the improvement comprising: each of said first, second and third antennae being mutually spaced a distance at least equal to the wavelength of the highest frequency received, the distance between the first and second antennae being greater than the distance between said second and third antennae by at least one half the wavelength of said highest frequency; each of said sets of information constituting a fine channel, and means for synthesizing a coarse channel from said fine channels; said last mentioned means including IF hybrid combinations and harmonic generators interconnected to provide for truth table type logic.

2. Structure in accordance with claim 1, including a pair of phase comparator bridges interconnected to a switching matrix, and a plurality of fine channel quantizers.

* * * * *